(12) United States Patent
Yukinobu

(10) Patent No.: US 7,438,835 B2
(45) Date of Patent: Oct. 21, 2008

(54) TRANSPARENT CONDUCTIVE FILM, COATING LIQUID FOR FORMING SUCH FILM, TRANSPARENT CONDUCTIVE LAYERED STRUCTURE, AND DISPLAY DEVICE

(75) Inventor: Masaya Yukinobu, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 460 days.

(21) Appl. No.: 10/498,504

(22) PCT Filed: Mar. 18, 2003

(86) PCT No.: PCT/JP03/03237

§ 371 (c)(1),
(2), (4) Date: Jun. 18, 2004

(87) PCT Pub. No.: WO03/081608

PCT Pub. Date: Oct. 2, 2003

(65) Prior Publication Data

US 2005/0062019 A1    Mar. 24, 2005

(30) Foreign Application Priority Data

Mar. 25, 2002  (JP)  ............ 2002-083032
Mar. 13, 2003  (JP)  ............ 2003-068706

(51) Int. Cl.
*H01B 1/00*     (2006.01)
*H01B 1/02*     (2006.01)

(52) U.S. Cl. .............. 252/514; 252/500; 252/512; 428/328; 428/330; 428/432; 428/434; 428/446; 524/430; 525/513

(58) Field of Classification Search ........... 252/513, 252/514, 512, 500; 428/432, 446, 328, 330, 428/434; 524/430; 525/513
See application file for complete search history.

(56) References Cited

U.S. PATENT DOCUMENTS

| 4,670,188 | A | * | 6/1987 | Iwasa et al. ............ 525/513 |
| 5,204,177 | A | * | 4/1993 | Sato et al. ............. 428/328 |
| 5,504,133 | A | * | 4/1996 | Murouchi et al. ........ 524/430 |
| 5,785,897 | A | * | 7/1998 | Toufuku et al. .......... 252/514 |
| 6,143,418 | A | * | 11/2000 | Takamiya et al. ........ 428/434 |
| 6,180,030 | B1 | * | 1/2001 | Hirai et al. ............ 252/512 |
| 6,261,479 | B1 | * | 7/2001 | Yukinobu et al. ........ 252/514 |
| 6,712,998 | B2 | * | 3/2004 | Kato ................... 252/514 |
| 6,740,416 | B1 | * | 5/2004 | Yokogawa et al. ........ 428/446 |
| 2002/0045050 | A1 | * | 4/2002 | Tamai et al. ........... 428/432 |
| 2004/0232386 | A1 | * | 11/2004 | Yorita et al. .......... 252/500 |
| 2005/0106382 | A1 | * | 5/2005 | Kashihara et al. ....... 428/330 |

FOREIGN PATENT DOCUMENTS

| EP | 0911859 A1 | 4/1999 |
| JP | 9-115438 | 5/1997 |
| JP | 10-1777 | 1/1998 |
| JP | 10-110123 | 4/1998 |
| JP | 10-142401 | 5/1998 |
| JP | 10-182191 | 7/1998 |
| JP | 11-228872 | 8/1999 |
| JP | 11-329071 | 11/1999 |
| JP | 2000-124662 | * 4/2000 |
| JP | 2000-196287 | 7/2000 |
| JP | 2000-357414 | 12/2000 |
| WO | WO 03/019579 A1 | * 3/2003 |

* cited by examiner

*Primary Examiner*—Mark Kopec
*Assistant Examiner*—Khanh Tuan Nguyen
(74) *Attorney, Agent, or Firm*—Kratz, Quintos & Hanson, LLP

(57) ABSTRACT

This transparent conductive film comprises a single-layer film obtained by coating on a substrate a transparent conductive film-forming coating liquid which contains chainlike agglomerates of noble metal-coated silver microparticles and a binder, the chainlike agglomerates having an average primary chain length set within the range of 100 to 500 nm, an average thickness set within the range of 1 to 30 nm and an average primary chain length-average thickness ratio set within the range of 3 to 100, and the binder being set within the range of 40 to 200 parts by weight based on 100 parts by weight of the noble metal-coated silver microparticles, wherein the single-layer film has a surface resistance of 50 to 2000 Ω/□ and a visible ray transmittance of 40 to 95% as determined alone and independently of the substrate.

8 Claims, No Drawings

TRANSPARENT CONDUCTIVE FILM, COATING LIQUID FOR FORMING SUCH FILM, TRANSPARENT CONDUCTIVE LAYERED STRUCTURE, AND DISPLAY DEVICE

TECHNICAL FIELD

The present invention relates generally to a transparent conductive film and a coating liquid for forming such a transparent conductive film. More particularly, this invention relates to a transparent conductive film which is capable of exhibiting excellent conductivity, high transmittance and great strength when this film is formed on a substrate and then used as a base material for display devices such as a plasma display panel (PDP), a vacuum fluorescent display (VFD), a liquid crystal display (LCD), an organic/inorganic electroluminescence display (ELD) and the like, solar batteries such as of a silicon semiconductor type, a Graztel model and the like, and electrodes such as a touch panel and the like. The invention further relates to a coating liquid for forming this transparent conductive film, a transparent conductive layered structure and a display device, which structure and device are provided with this transparent conductive film, respectively.

BACKGROUND ART

Currently, transparent electrodes have found applications to various displays, various solar batteries, and touch panels. To fabricate these transparent electrodes, a method has been widely used in which indium-tin oxide (ITO) is sputtered to form a film on a glass substrate, a plastic substrate or the like.

The use of this method allows formation, on the substrate, of a transparent conductive film having a surface resistance of several dozen to several hundred $\Omega/\square$, thus exhibiting superior conductivity. Nevertheless, the method poses the problem that it needs to use considerably expensive sputtering equipment, and also has the drawback that it finds difficulty in using substrates which are less resistant to heat because a substrate used in the method has to be exposed to heating during film formation.

Alternatively, a method has been proposed in which a transparent conductive film-forming coating liquid containing microparticles of noble metals and the like dispersed in a solvent is coated on a substrate by spin coating or the like, followed by drying, and thereafter, a transparent coat layer-forming coating liquid comprising silica sol is coated on the resultant dry coat, followed by drying and subsequent baking at a temperature in the vicinity of 200° C., thereby forming a transparent conductive film of a double-layer type (see Japanese Patent Laid-Open Publications No. 10-110123, No. 10-142401, No. 10-182191, No. 11-329071, No. 2000-124662 and No. 2000-196287).

However, such a method has to form a double-layered coated film by coating and drying a transparent conductive film-forming coating liquid and a transparent coat layer-forming coating liquid, respectively, and hence involves tedious process steps. Another problem is that it is difficult to ensure electrical connection with respect to the resulting transparent conductive film because a transparent coat layer of a relatively electrically insulative character is present on the film. Hence, this method is still unsatisfactory for fabricating a transparent electrode.

To cope with these problems, from some consideration of the above-noted conventional methods, a method may be regarded as feasible in which a transparent conductive film-forming coating liquid containing microparticles of noble metals and the like dispersed in a solvent is coated on a substrate, followed by drying, and the resultant dry coat is then baked to obtain a transparent conductive film of a single-layer type with no need for coating a transparent coat layer-forming coating liquid. The film formed by this method is problematic in that it is extremely poor in film strength, for example, to such an extent that it is simply releasable upon finger rubbing on its surface.

Moreover, the above-cited Japanese Patent Laid-Open Publications No. 11-329071 and No. 2000-124662 describe that film strength (scratch strength) can be improved by adding, to a transparent conductive film-forming coating liquid containing microparticles of noble metals and the like dispersed in a solvent, silica microparticles (colloidal silica) having an average particle diameter of 100 nm or below and set within the range of 1 to 60% by weight (preferably 20 to 40% by weight) based on the weight of the microparticles of noble metals and the like.

However, in the case of a transparent conductive film obtained by use of the above transparent conductive film-forming coating liquid alone, but by omission of a transparent coat layer-forming coating liquid, the film strength is still far from satisfactory. The film cannot simply be used as such in single-layer form. This is presumably because the conventional methods described in Japanese Patent Laid-Open Publications No. 11-329071 and No. 2000-124662 are contrived to use, as a binder component, colloidal silica having a considerably larger particle diameter (generally 5 to 20 nm in average particle diameter) than that of silica sol used in common coating liquids.

On the other hand, as a replacement for the above-noted conventional method in which both a transparent conductive film-forming coating liquid and a transparent coat layer-forming coating liquid are used, a method has been proposed in which a transparent conductive single-layer film is obtained by the use of a transparent conductive film-forming coating liquid containing silica sol or the like added as a binder component (see Japanese Patent Laid-Open Publications No. 09-115438 and No. 10-1777).

In the methods described in Japanese Patent Laid-Open Publications No. 09-115438 and No. 10-1777, however, a transparent conductive film-forming coating liquid is used which contains microparticles of noble metals and the like held monodisperse. In such an instance, in a step of drying the coating liquid, the binder component tends to fill in between the microparticles of noble metals and the like, obstructing microparticle-to-microparticle contact of the microparticles, so that the binder component needs to be used in controlled limited amounts.

Hence, the resulting transparent conductive film has a low strength corresponding to a pencil hardness of 3H or so. The film still causes insufficient strength.

That is, a transparent conductive film having low resistance and high transmittance can be obtained only when microparticles of noble metals and the like mutually interconnect in a step of drying a transparent conductive film-forming coating liquid and eventually provide a grown network structure. The methods described in Japanese Patent Laid-Open Publications No. 09-115438 and No. 10-1777 present the problem that a balance is difficult to establish between the improvement of a film strength made by adding a binder component and the provision of a network structure derived by using the above microparticles.

The present invention has been made with attention focused on the above-discussed problems. Objects of this invention are to provide a transparent conductive single-layer film formed on a substrate by spin coating or the like and having excellent conductivity, high transmittance and great strength, and a transparent conductive film-forming coating liquid for use in forming such a transparent conductive single-layer film.

Other objects of the invention are to provide a transparent conductive layered structure provided with such a transparent conductive single-layer film, and a display device fabricated by incorporating such a layered structure therein.

DISCLOSURE OF THE INVENTION

More specifically, a transparent conductive film according to the present invention for formation on a substrate comprises: a single-layer film formed by coating on a substrate a transparent conductive film-forming coating liquid which contains chainlike agglomerates of noble metal-coated silver microparticles and a binder, the chainlike agglomerates having an average primary chain length set within the range of 100 to 500 nm, an average thickness set within the range of 1 to 30 nm, and an average primary chain length-average thickness ratio set within the range of 3 to 100, and the binder being set within the range of 40 to 200 parts by weight based on 100 parts by weight of the noble metal-coated silver microparticles, wherein the single-layer film has a surface resistance of 50 to 2000 $\Omega/\square$ and a visible ray transmittance of 40 to 95% as determined alone and independently of the substrate.

Moreover, a transparent conductive film-forming coating liquid according to the invention for use in forming the above-specified transparent conductive film comprises: a solvent; chainlike agglomerates of noble metal-coated silver microparticles; and a binder, the latter two of which have been dispersed in the solvent, the chainlike agglomerates having an average primary chain length set within the range of 100 to 500 nm, an average thickness set within the range of 1 to 30 nm, and an average primary chain length-average thickness ratio set within the range of 3 to 100, wherein the binder is set within the range of 40 to 200 parts by weight based on 100 parts by weight of the noble metal-coated silver microparticles.

Next, a transparent conductive layered structure according to the invention comprises a transparent substrate and the above-specified transparent conductive film which has been formed on the transparent substrate.

Furthermore, a display device according to the invention comprises a body member provided with a transparent conductive film, wherein the above-specified transparent conductive layered structure has been incorporated as the body member.

BEST MODE FOR CARRYING OUT THE INVENTION

The present invention will now be described below in specific manner and in great detail.

Firstly, this invention has been accomplished as a result of the finding that in the case where chainlike agglomerates of noble metal-coated silver microparticles are used, as microparticles of noble metals and the like, which have an average primary chain length set within the range of 100 to 500 nm, an average thickness set within the range of 1 to 30 nm, and an average primary chain length-average thickness ratio set within the range of 3 to 100, the chainlike agglomerates allow for formation of a network structure of noble metal-coated silver microparticles even with a binder component added, in an amount large enough to improve film strength, to the corresponding transparent conductive film-forming coating liquid, but with the noble metal-coated silver microparticles not obstructed by the binder component in a step of coating and drying the coating liquid.

In other words, in the case of use of the conventional transparent conductive film-forming coating liquid which contains microparticles of noble metals and the like held monodisperse and a binder component, this coating liquid experiences the drawback that the binder component tends to fill in between the microparticles of noble metals and the like in a step of coating and drying the coating liquid, hence obstructing microparticle-to-microparticle contact of the microparticles, and consequently preventing the above-described network structure from coming to form. The network structure is vital for imparting high transmittance and excellent conductivity to a transparent conductive film constituted of microparticles of noble metals and the like. The network comprising the above microparticles has net portions playing a conductive role and open portions functioning to transmit light rays therethrough.

As a substitute for the conventional method in which the microparticles of noble metals and the like are caused to become monodisperse in a solvent, the present invention has therefore adopted a technique designed to use a transparent conductive film-forming coating liquid which contains chainlike agglomerates of noble metal-coated silver microparticles dispersed in a solvent, the chainlike agglomerates having an average primary chain length set within the range of 100 to 500 nm, an average thickness set within the range of 1 to 30 nm and an average primary chain length-average thickness ratio set within the range of 3 to 100, and to further add a binder component to this transparent conductive film-forming coating liquid, the binder component being set within the range of 40 to 200 parts by weight based on 100 parts by weight of the noble metal-coated silver microparticles, thereby enabling a network structure of the noble metal-coated silver microparticles to be formed despite the presence of the binder component.

Here, if the chainlike agglomerates of noble metal-coated silver microparticles depart from the requirements that the average primary chain length should range from 10 to 500 nm (preferably from 200 to 500 nm), the average thickness should range from 1 to 30 nm (preferably from 5 to 30 nm), and the average primary chain length-average thickness ratio should range from 3 to 100, this departure results in disadvantages which include the difficulty in providing a network structure of noble metal-coated silver microparticles. Namely, if the average primary chain length is less than 100 nm, or if the average primary chain length-average thickness ratio is less than 3, the resulting transparent conductive film leads to increased resistance. Conversely, if the average primary chain length is over 500 nm, or if the average primary chain length-average thickness ratio is over 100, filtration is difficult to effect during preparation of a transparent conductive film-forming coating liquid. In addition, if the average thickness is less than 1 nm, it is difficult to prepare a transparent conductive film-forming coating liquid. If the average thickness exceeds 30 nm, the resulting transparent conductive film scatters visible ray to a large extent (i.e., the film haze becomes increased). In accordance with the present invention, it is therefore required that as to the chainlike agglomerates of noble metal-coated silver microparticles, the average primary chain length should range from 100 to 500 nm, the average thickness should range from 1 to 30 nm, and the average primary chain length-average thickness ratio should range from 3 to 100. As to the chainlike agglomerates of noble metal-coated silver microparticles, the average primary chain length and average thickness used in the present description represent any numerical values which are determined by observation of the microparticles on a transmission electron microscope (TEM).

Here, the microparticles of noble metals and the like used in the transparent conductive film-forming coating liquids of the conventional art are noble metal microparticles selected from gold, silver, platinum, palladium, rhodium and ruthenium.

Comparison is drawn, in view of specific resistance, between silver, gold, platinum, rhodium, ruthenium and palladium. The specific resistances of platinum, rhodium, ruthenium and palladium are 10.6, 4.51, 7.6 and 10.8 $\mu\Omega\cdot cm$, respectively, which are larger than 1.62 and 2.2 $\mu\Omega\cdot cm$ of silver and gold, respectively. Thus, it is considered advantageous to use silver microparticles or gold microparticles so as to form a transparent conductive film having a low surface resistance.

However, the use of silver microparticles limits the applications from the standpoint of weather resistance because the microparticles become severely deteriorated due to sulfurization or upon exposure to brine. In contrast, the use of gold microparticles, platinum microparticles, rhodium microparticles, ruthenium microparticles and palladium microparticles eliminates the problem with weather resistance, but cannot necessarily be said to be most appropriate in the light of cost.

In accordance with the present invention, noble metal-coated silver microparticles are used in which the surfaces of the silver microparticles are coated with a noble metal, not inclusive of silver, selected from, for example, gold, platinum, palladium, rhodium and ruthenium, as the above-noted microparticles that are capable of meeting with the requirements relative to both weather resistance and cost.

Referring next to a binder component to be added to the transparent conductive film-forming coating liquid for use in forming a transparent conductive film, the amount must be set within the range of 40 to 200 parts by weight (preferably 50 to 150 parts by weight) based on 100 parts by weight of the noble metal-coated silver microparticles. This is because if the above amount is less than 40 parts by weight, the resulting transparent conductive film brings about insufficient film strength, whereas amounts exceeding 200 parts by weight result in a transparent conductive film having increased resistance.

In accordance with the present invention, the chainlike agglomerates of noble metal-coated silver microparticles are used which have an average primary chain length in the range of 100 to 500 nm, an average thickness in the range of 1 to 30 nm and an average primary chain length-average thickness ratio in the range of 3 to 100. The chainlike agglomerates enable a network structure of the noble metal-coated silver microparticles to be formed even with a binder component added, in an amount large enough for increased film strength, that is, 40 to 200 parts by weight (preferably 50 to 150 parts by weight) based on 100 parts by weight of the noble metal-coated silver microparticles, to the transparent conductive film-forming coating liquid, but with the noble metal-coated silver microparticles not obstructed by the binder component in a step of coating and drying the coating liquid.

As the above binder, an organic and/or inorganic binder, or an organic-inorganic composite binder can be used.

Varieties of the binder may optionally be chosen depending on the types of substrates to be used and the curing conditions for transparent conductive films to be formed.

The organic binder noted above is at least one or more selected from a thermoplastic resin, a thermosetting resin, a room-temperature-curing resin, an ultraviolet-curing resin and an electron-curing resin. For example, the thermoplastic resin includes acrylic resin, PET resin, polyolefin resin, polyvinyl chloride resin, polyvinyl butyral resin, PVP resin, polyvinyl alcohol resin and the like; the thermosetting resin includes epoxy resin and the like; the room-temperature-curing resin includes two-pack epoxy resin, urethane resin and the like; the ultraviolet-curing resin includes resins containing various types of oligomers, monomers and photoinitiators and the like; and the electron-curing resin includes resins containing various types of oligomers or monomers and the like. Needless to add, however, the listed resins should not be construed as limiting.

As the inorganic binder, it includes a binder composed chiefly of silica sol. The inorganic binder may contain magnesium fluoride microparticles, alumina sol, zirconia sol, titania sol or the like. As the silica sol noted here, use can be made of a polymeric product obtained by adding water and an acid catalyst to ortho-alkyl silicate to effect hydrolysis, followed by dehydropolycondensation caused to proceed to a given degree, or a polymeric product obtained by subjecting a commercially available alkyl silicate solution to hydrolysis and dehydropolycondensation caused to further proceed to a given degree, which alkyl silicate solution has already been polymerized up to a 4 (tetra)- to 5 (penta)-mer. The solution increases in viscosity as the dehydropolycondensation proceeds, and finally becomes solidified. The degree of dehydropolycondensation is thus controlled to be lower than the maximum viscosity at which coating can be performed on a transparent substrate such as a glass substrate or a plastic substrate. The degree of dehydropolycondensation is not particularly specified so long as it is maintained at a level lower than the above maximum viscosity, but is set preferably within the range of about 500 to about 50000 in weight-average molecular weight when film strength and weather resistance are considered. The dehydropolycondensation is substantially completed during heating subsequently to coating and drying of the transparent conductive film-forming coating liquid so that a polymer of the alkyl silicate hydrolysis product turns into a hard silicate film (a film composed chiefly of silicon oxide).

The above-noted organic-inorganic composite binder is, for example, a composite material of an organic binder and an inorganic binder, or a siloxane type polymer.

Next, the transparent conductive film-forming coating liquid which contains the chainlike agglomerates of noble metal-coated silver microparticles held dispersed can be prepared by the processes that follow.

First, a colloidal dispersion of silver microparticles is prepared by a known process [e.g., the Cary-Lea process, Am. J. Sci., 37, 47 (1889) and Am. J. Sci., 38 (1889)]. Namely, a mixed solution of an aqueous iron (II) sulfate solution and an aqueous sodium citrate solution is added to an aqueous silver nitrate solution, and the whole is then reacted. The sediment having been formed is filtered and washed, followed by addition of pure water, so that a colloidal dispersion of silver microparticles (Ag: 0.1 to 10% by weight) can simply be prepared. This colloidal dispersion of silver microparticles may be prepared by any process, without limitation to the above-cited process, so long as silver microparticles can be dispersed to have an average particle diameter of about 1 to about 30 nm.

Secondly, to the colloidal dispersion of silver microparticles thus obtained, a reducing agent-containing solution and any one of the (A) to (C) solutions indicated below are added separately dropwise to thereby coat the surfaces of the silver microparticles with gold alone or platinum alone, or a composite of gold and platinum. A colloidal dispersion of noble metal-coated silver microparticles can thus be obtained (a step of preparing noble metal-coated silver microparticles).

(A) An alkali metal aurate solution or an alkali metal platinate solution.
(B) An alkali metal aurate solution and an alkali metal platinate solution.
(C) A solution of a mixture of an alkali metal aurate and an alkali metal platinate.

In this step of preparing the noble metal-coated silver microparticles, a dispersant may be added in a small amount, where desired, to at least one of the colloidal dispersion of silver microparticles, the reducing agent-containing solution and any one of the (A) to (C) solutions, or to each of such dispersion and solutions.

Preferably, the colloidal dispersion of noble metal-coated silver microparticles thus obtained may then be subjected to desalting treatment by dialysis, electrodialysis, ion exchange, ultrafiltration or the like in order to lower the concentration of an electrolyte in the dispersion. Because colloids are prone to commonly agglomerate when electrolytes are present at a high concentration, it is preferred that the electrolytes be made low in their concentrations. Such a phenomenon is known also as the Schulze-Hardy's rule.

The colloidal dispersion of noble metal-coated silver microparticles which has been desalted is thereafter subjected to concentrating treatment. By this treatment, a colloidal dispersion can be obtained which includes the noble metal-coated silver microparticles held monodisperse at a high concentration.

To the dispersion containing the noble metal-coated silver microparticles held monodisperse at a high concentration, a hydrazine solution is added to cause the noble metal-coated silver microparticles to agglomerate. The dispersion is then retained, for example, at room temperature for several minutes to about 1 hour, followed by addition of a hydrogen peroxide solution, thereby obtaining a dispersion in which the chainlike agglomerates of noble metal-coated silver microparticles have been dispersed at a high concentration.

To this dispersion which contains the chainlike agglomerates of noble metal-coated silver microparticles dispersed at a high concentration, a binder, an organic solvent and the like are added to make component adjustments (microparticle concentration, binder concentration, water concentration, organic solvent concentration and the like). In this way, a transparent conductive film-forming coating liquid is obtained which contains the chainlike agglomerates of noble metal-coated silver microparticles and the binder.

The silica sol when used in the binder may preferably be subjected to ion-exchanging treatment. This is because ion impurities present in the silica sol are liable to adversely affect the dispersion stability of the chainlike agglomerates of noble metal-coated silver microparticles.

Here, little is known about the reason that the addition of a hydrazine solution may cause the noble metal-coated silver microparticles to agglomerate. It is believed that the dispersion stability of the noble metal-coated silver microparticles lowers owing to the action of hydrazine as alkali ions, or the action of the hydrazine as a reducing agent to lower the redox potential of the system.

Namely, when a hydrazine ($N_2H_4$) solution is added to a dispersion of noble metal-coated silver microparticles in which the noble metal-coated silver microparticles are held monodisperse in a solvent, the dispersion stability of the noble metal-coated silver microparticle lowers (the zeta potential [absolute value] of the system lowers), so that the noble metal-coated silver microparticles agglomerate in the shape of chains, thus forming chainlike agglomerates of the noble metal-coated silver microparticles; further addition of a hydrogen peroxide ($H_2O_2$) solution to the system causes the hydrazine to become decomposed and removed by the action of the hydrogen peroxide, so that the dispersion stability of the chainlike agglomerates is again improved (the zeta potential [absolute value] of the system increases), while the state of agglomeration of the chainlike agglomerates is maintained unchanged; and a series of such reactions form only water ($H_2O$) and nitrogen gas ($N_2$) as reaction products, as shown by the following chemical equation (1), and hence do not induce secondary generation of impurity ions. This process is markedly simple and efficient in obtaining chainlike agglomerates of noble metal-coated silver microparticles.

$$N_2H_4 + 2H_2O_2 \rightarrow 4H_2O + N_2 \uparrow \quad (1)$$

The concentrating treatment of the colloidal dispersion of noble metal-coated silver microparticles described above can be carried out in usual manner by means of vacuum evaporation, ultrafiltration or the like. By regulating the degree of concentration, the water concentration in the transparent conductive film-forming coating liquid can be controlled, for example, within the range of 1 to 50% by weight.

Here, the state of agglomeration (i.e., average primary chain length, average thickness and average primary chain length-average thickness ratio of the chainlike agglomerates of noble metal-coated silver microparticles) relative to the chainlike agglomerates of noble metal-coated silver microparticles can be controlled at will by regulating the amount of the hydrazine solution to be added. This agglomeration state is also controllable by regulating the time (retention time) and the temperature (retention temperature) by and at which the hydrogen peroxide is added subsequently to addition of the hydrazine solution. This is because the state in which the dispersion of noble metal-coated silver microparticles has been destabilized by the addition of the hydrazine solution is maintained until the hydrogen peroxide is added.

Next, solvents suited for use in the transparent conductive film-forming coating liquid are not particularly restricted and may arbitrarily be chosen to match the coating processes and film forming conditions to be employed. Examples include alcohol type solvents such as methanol (MA), ethanol (EA), 1-propanol (NPA), isopropanol (IPA), butanol, pentanol, benzyl alcohol, diacetone alcohol and the like, ketone type alcohols such as acetone, methyl ethyl ketone (MEK), methyl propyl ketone, methyl isobutyl ketone (MIBK), cyclohexanone, isophorone and the like, glycol derivatives such as ethylene glycol monomethyl ether (MCS), ethylene glycol monoethyl ether (ECS), ethylene glycol isopropyl ether (IPC), propylene glycol methyl ether (PGM). propylene glycol ethyl ether (PE), propylene glycol methyl ether acetate (PGM-AC), propylene glycol ethyl ether acetate (PE-AC) and the like, formamide (FA), N-methyl formamide, dimethyl formamide (DMF), dimethylacetamide, dimethyl sulfoxide (DMSO), N-methyl-2-pyrrolidone (NMP) and the like. Note that these solvents are not limiting.

Next, by use of the transparent conductive film-forming coating liquid described above, a transparent conductive layered structure can be obtained which is constituted, for example, of a transparent substrate and a transparent conductive single-layer film formed thereon.

By incorporation of this transparent conductive layered structure as a member provided with a transparent conductive film, display devices can be fabricated which include a plasma display panel (PDP), a vacuum fluorescent display (VFD), a liquid crystal display (LCD), an organic/inorganic electroluminescence display (ELD) and the like. In particular, in the case of the liquid crystal display (LCD), a transparent conductive layered structure can be used which has a transparent conductive single-layer film formed on a colored layer (a color filter layer) and a transparent protective layer successively formed on a transparent substrate.

In order to form the transparent conductive single-layer film on a transparent substrate, the following process may be employed.

That is, the transparent conductive film-forming coating liquid, which contains the chainlike agglomerates of noble meal-coated silver microparticles having an average primary chain length set within the range of 100 to 500 nm, an average thickness set within the range of 1 to 30 nm and an average primary chain length-average thickness ratio set within the range of 3 to 100, and the binder set within the range of 40 to 200 parts by weight based on 100 parts by weight of the noble metal-coated silver microparticles, is coated on a substrate such as a glass substrate or a plastic substrate by means of spin coating, spray coating, wire bar coating, doctor blade coating or the like, optionally followed by drying. Heat treatment is then performed, for example, at a temperature of about 50 to about 350° C. to cause the coating liquid to cure, thereby forming the transparent conductive single-layer film described above. Here, in the case of use of a transparent conductive film-forming coating liquid containing chainlike agglomerates of noble metal-coated silver microparticles coated with gold or platinum, the optimized conditions for heat treatment in curing this coating liquid are at 50 to 250° C. for 2 to 60 minutes, more preferably at 80 to 200° C. for 2 to 30 minutes. However, when an ultraviolet- or electron-curing resin is used as the binder component, the energy evolved by ultraviolet or electron irradiation acts to grow the network structure of noble metal-coated silver microparticles. This allows the film to be cured at as relatively low a temperature as 50 to 150° C. for as relatively short a period as several to several dozen seconds.

The transparent conductive single-layer film thus formed has an internal structure in which the binder is set within the range of 40 to 200 parts by weight based 100 parts by weight of the noble metal-coated silver microparticles, and the binder has infilled the opening portions of the network structure constituted of the chainlike agglomerates of the noble metal-coated silver microparticles. Consequently, this film exhibits as high a visible ray transmittance as 40 to 95% and an excellent conductivity corresponding to as low a surface resistance as 50 to 2000 Ω/□. In addition, the area of contact between the substrate and the binder becomes large through the intermediation of the opening portions of the network structure, thus providing a strong bond therebetween to achieve enhanced film strength.

As stated above, the transparent conductive film according to the present invention comprises a single-layer film formed by coating on a substrate a transparent conductive film-forming coating liquid which contains chainlike agglomerates of noble metal-coated silver microparticles and a binder, the chainlike agglomerates having an average primary chain length set within the range of 100 to 500 nm, an average thickness set within the range of 1 to 30 nm and an average primary chain length-average thickness ratio set within the range of 3 to 100, and the binder being set within the range of 40 to 200 parts by weight based on 100 parts by weight of the noble metal-coated silver microparticles, wherein the single-layer film has a surface resistance of 50 to 2000 Ω/□ and a visible ray transmittance of 40 to 95% as determined alone and independently of the substrate. Thus, the transparent conductive film has excellent conductivity, high transmittance and great strength. The transparent conductive layered structure provided with this transparent conductive film is useful, as described previously, for display devices such as a plasma display panel (PDP), a vacuum fluorescent display (VFD), a liquid crystal display (LCD), an organic/inorganic electroluminescence display (ELD) and the like, and further for solar batteries such as of a silicon semiconductor type, a Graztel model and the like, and transparent electrodes such as a touch panel and the like.

The present invention is described below in greater detail by reference to its Examples. It is to be understood that this invention is not restricted to the Examples. In the following description, "%" denotes "% by weight" except for "%" used to determine transmittance, reflectance and haze value, and "part" denotes "part by weight."

EXAMPLE 1

A colloidal dispersion of silver microparticles was prepared by the Carey-Lea process noted above.

To be specific, to 330 g of an aqueous 9% silver nitrate solution, a mixed solution of 390 g of an aqueous 23% iron (II) sulfate solution and 480 g of an aqueous 37.5% sodium citrate solution was added, and thereafter, the sediment having been formed was filtered and washed, followed by addition of pure water to prepare a colloidal dispersion of silver microparticles (Ag: 0.15%).

To 600 g of this colloidal dispersion of silver microparticles, 80.0 g of an aqueous 1% hydrazine monohydrate ($N_2H_4.H_2O$) solution was added, and a mixed solution of 4800 g of an aqueous potassium aurate [$KAu(OH)_4$] solution (Au: 0.075%) and 2.0 g of an aqueous 1% polymeric dispersant solution was further added with stirring to obtain a colloidal dispersion of noble metal-coated silver microparticles coated with gold alone.

This colloidal dispersion of noble metal-coated silver microparticles was desalted with an ion exchange resin (trade name: DIAION SK1B, SA20AP, manufactured by Mitsubishi Chemical Corporation), followed by ultrafiltration to effect concentration of the colloidal dispersion of noble metal-coated silver microparticles. To the resultant dispersion, ethanol (EA) was added to obtain a dispersion containing the noble metal-coated silver microparticles held monodisperse at a high concentration (Au—Ag: 1.6%, water: 20.0% and EA: 78.4%) (liquid B).

Subsequently, while 60 g of liquid B was being stirred, 0.8 g of an aqueous hydrazine solution ($N_2H_4.H_2O$: 0.75%) (the 0.8 g amount of the hydrazine solution was equivalent to 100 ppm of hydrazine based on the weight of the 1.6% Au—Ag dispersion) was added to that liquid over a period of 1 minute. Then, the system was retained at room temperature for 15 minutes, followed by further addition of 0.6 g of an aqueous hydrogen peroxide solution ($H_2O_2$: 1.5%) over a period of 1 minute to obtain a dispersion containing chainlike agglomerates of the noble metal-coated silver microparticles dispersed at a high concentration (liquid C).

In addition, in regard to the lowering of dispersion stability relative to the noble metal-coated silver microparticles, which occurs when the hydrazine solution is added to the dispersion containing the noble metal-coated silver microparticles held monodisperse at a high concentration (liquid B), and the improvement of dispersion stability relative to the chainlike agglomerates, which occurs when the hydrogen peroxide solution is added to the dispersion containing the noble metal-coated silver microparticles held agglomerated, these phenomena of dispersion stability have scientifically been confirmed from the measurements of zeta potentials of the respective dispersions.

Next, to the dispersion containing the chainlike agglomerates of noble metal-coated silver microparticles dispersed at a high concentration (liquid C) thus obtained, a silica sol solution (liquid D) used as a binder component, acetone, ethanol (EA), propylene glycol monomethyl ether (PGM), diacetone alcohol (DAA) and formamide (FA) were added to obtain a transparent conductive film-forming coating liquid according to Example 1 (Ag: 0.08%, Au: 0.32%, $SiO_2$: 0.4%, water: 5.8%, acetone: 20%, EA: 53.3%, PGM: 15%, DAA: 5% and FA: 0.03%), which contained the chainlike agglomerates of noble metal-coated silver microparticles and the binder component, and was adjusted to a concentration to enable the coating liquid to be directly used in forming a transparent conductive film.

This transparent conductive film-forming coating liquid was observed on a transmission electron microscope to reveal that the chainlike agglomerates of noble metal-coated silver microparticles were formed from noble metal-coated silver microparticles of about 6 nm in primary particle diameter which were held beaded and partially branched in shape [length: 100 to 500 μm (maximum value of length in individual chainlike agglomerates), average length: 250 nm, average thickness: 6 nm, average length-average thickness ratio: 17 to 70].

Subsequently, the transparent conductive film-forming coating liquid containing the chainlike agglomerates of noble metal-coated silver microparticles and the binder component was filtered by the use of a filter with a filtering precision (pore size): 10 μm. The filtrate was then spin-coated (at 100 rpm for 90 seconds) on a glass substrate (a 3-mm thick soda-lime glass) heated to 40° C., followed by curing at 180° C. for 20 minutes to obtain a glass substrate provided with a transparent conductive single-layer film constituted of the chainlike agglomerates of noble metal-coated silver microparticles and the binder, that is, a transparent conductive layered structure according to Example 1.

The above glass substrate was used after being polished with a cerium oxide type polishing agent, cleaned with pure water, dried and then heated to 40° C.

Here, the silica sol solution (liquid D) described above was made up by the use of 19.6 parts of Methyl Silicate 51 (trade name, manufactured by Colcoat Co., Ltd.), 57.8 parts of ethanol, 7.9 parts of an aqueous 1% nitric acid solution and 14.7 parts of pure water to obtain one having a solid content concentration of 10% of $SiO_2$ (silicon oxide) and a weight-average molecular weight of 1200, which was finally diluted with ethanol and further deionized with an anion exchange resin so as to have a solid content concentration of 5.0% of $SiO_2$.

Film characteristics (surface resistance, visible ray transmittance, haze value, visible ray reflectance and film strength) of the transparent conductive single-layer film formed on the glass substrate are shown in Table 1 below. In Table 1, the transmittance (of visible ray) of each transparent conductive single-layer film measured alone and independently of the transparent substrate (the glass substrate) is determined as follows: namely, transmittance (%) of transparent conductive single-layer film alone and exclusive of substrate=
[(transmittance measured on whole structure inclusive of substrate)/(transmittance of substrate)]×100

Here, in the present description, the value obtained by measuring the transmittance of the transparent conductive single-layer film alone and independently of the substrate is taken as representing the visible ray transmittance unless otherwise noted.

The surface resistance of each transparent conductive single-layer film was also measured with a surface resistance meter, LORESTA AP (MCP-T400), manufactured by Mitsubishi Chemical Corporation. The haze value and visible ray transmittance were measured with a haze meter (HR-200) manufactured by Murakami Color Research Laboratory. The reflectance was measured with a spectrophotometer (U-4000) manufactured by Hitachi, Ltd. The shape and particle size (average primary chain length, average thickness and average primary chain length-average thickness ratio) of the chainlike agglomerates of noble metal-coated silver microparticles were observed with a transmission electron microscope manufactured by JEOL, Ltd. Additionally, the film strength of each transparent conductive single-layer film was judged by checking how it became appreciably scratched upon fingernail scratching on the film surface, and the film hardness of the transparent conductive single-layer film was judged according to the pencil hardness evaluation which will be described below.

EXAMPLE 2

A silica sol solution (liquid E), which contained a methyl group, was made up by the use of 17.4 parts of Methyl Silicate 51 (trade name, manufactured by Colcoat Co., Ltd.), 2.52 parts of methyltrimethoxysilane, 57.48 parts of ethanol, 7.9 parts of an aqueous 1% nitric acid solution and 14.7 parts of pure water to obtain one having a solid content concentration of 10% of $SiO_2$ (as converted to silicon oxide) and a weight-average molecular weight of 1360, which was finally diluted with ethanol and further deionized with an anion exchange resin so as to have a solid content concentration of 2.0% of converted $SiO_2$.

Next, to the dispersion (liquid C) obtained in Example 1 and containing the chainlike agglomerates of noble metal-coated silver microparticles dispersed at a high concentration, the above liquid E, acetone, ethanol (EA), propylene glycol monomethyl ether (PGM), diacetone alcohol (DAA) and formamide (FA) were added to obtain a transparent conductive film-forming coating liquid according to Example 2 (Ag: 0.08%, Au: 0.32%, methyl group-containing $SiO_2$: 0.2%, water: 5.8%, acetone: 20%, EA: 53.5%, PGM: 15%, DAA: 5% and FA: 0.03%), which contained the chainlike agglomerates of noble metal-coated silver microparticles and the binder component, and was adjusted to a concentration to enable the coating liquid to be directly used in forming a transparent conductive film.

Then, the procedure of Example 1 was repeated except that this transparent conductive film-forming coating liquid was spin-coated (at 90 rpm for 10 seconds and then at 150 rpm for 70 seconds) on a PET film substrate (100-micron thick, corona-discharged) heated to 40° C., followed by curing at 140° C. for 20 minutes, thereby obtaining a PET film substrate provided with a transparent conductive single-layer film constituted of the chainlike agglomerates of noble metal-coated silver microparticles and the binder, that is, a transparent conductive layered structure according to Example 2.

Film characteristics (surface resistance, visible ray transmittance, haze value, visible ray reflectance and film strength) of the transparent conductive single-layer film formed on the PET film substrate are shown in Table 1.

EXAMPLE 3

To the dispersion (liquid C) obtained in Example 1 and containing the chainlike agglomerates of noble metal-coated silver microparticles dispersed at a high concentration, a thermosetting epoxy resin solution, acetone, ethanol (EA), propylene glycol monomethyl ether (PGM), diacetone alcohol (DAA) and formamide (FA) were added to obtain a transparent conductive film-forming coating liquid according to Example 3 (Ag: 0.08%, Au: 0.32%, thermosetting epoxy resin: 0.2%, water: 5.8%, acetone: 20%, EA: 53.5%, PGM: 15%, DAA: 5% and FA: 0.03%), which contained the chainlike agglomerates of noble metal-coated silver microparticles and the binder component, and was adjusted to a concentration to enable the coating liquid to be directly used in forming a transparent conductive film.

Then, the procedure of Example 1 was repeated except that this transparent conductive film-forming coating liquid was spin-coated (at 90 rpm for 10 seconds and then at 150 rpm for 70 seconds) on a PET film substrate (100-micron thick, corona-discharged) heated to 40° C., followed by curing at 120° C. for 120 minutes, thereby obtaining a PET film substrate provided with a transparent conductive single-layer film constituted of the chainlike agglomerates of noble metal-coated silver microparticles and the binder, that is, a transparent conductive layered structure according to Example 3.

Film characteristics (surface resistance, visible ray transmittance, haze value, visible ray reflectance and film strength) of the transparent conductive single-layer film formed on the PET film substrate are shown in Table 1.

Comparative Example 1

To the dispersion (liquid B) obtained in Example 1 and containing the noble metal-coated silver microparticles held monodisperse at a high concentration, the silica sol solution (liquid D) used as a binder component, acetone, ethanol (EA), propylene glycol monomethyl ether (PGM), diacetone alcohol (DAA) and formamide (FA) were added to obtain a transparent conductive film-forming coating liquid according to Comparative Example 1 (Ag: 0.08%, Au: 0.32%, $SiO_2$: 0.4%, water: 5.8%, acetone: 20%, EA: 53.3%, PGM: 15%, DAA: 5% and FA: 0.03%), which contained the noble metal-coated silver microparticles having individual microparticles not held agglomerated and the binder.

Then, the procedure of Example 1 was repeated except that this transparent conductive film-forming coating liquid was used, thereby obtaining a glass substrate provided with a transparent conductive single-layer film constituted of the noble metal-coated silver microparticles and the binder, that is, a transparent conductive layered structure according to Comparative Example 1.

Film characteristics (surface resistance, visible ray transmittance, haze value, visible ray reflectance and film strength) of the transparent conductive single-layer film formed on the glass substrate are shown in Table 1 below.

Comparative Example 2

To the dispersion (liquid C) obtained in Example 1 and containing the chainlike agglomerates of noble metal-coated silver microparticles dispersed at a high concentration, the silica sol solution (liquid D) used as a binder component, acetone, ethanol (EA), propylene glycol monomethyl ether (PGM), diacetone alcohol (DAA) and formamide (FA) were added to obtain a transparent conductive film-forming coating liquid according to Comparative Example 2 (Ag: 0.08%, Au: 0.32%, $SiO_2$: 1.6%, water: 8.0%, acetone: 20%, EA: 49.9%, PGM: 15%, DAA: 5% and FA: 0.03%), which contained the chainlike agglomerates of noble metal-coated silver microparticles and the binder component, and was adjusted to a concentration to enable the coating liquid to be directly used in forming a transparent conductive film.

Then, the procedure of Example 1 was repeated except that this transparent conductive film-forming coating liquid was used, thereby obtaining a glass substrate provided with a transparent conductive single-layer film constituted of the chainlike agglomerates of noble metal-coated silver microparticles and the binder, that is, a transparent conductive layered structure according to Comparative Example 2.

Film characteristics (surface resistance, visible ray transmittance, haze value, visible ray reflectance and film strength) of the transparent conductive single-layer film formed on the glass substrate are shown in Table 1 below.

Comparative Example 3

To the dispersion (liquid C) obtained in Example 1 and containing the chainlike agglomerates of noble metal-coated silver microparticles dispersed at a high concentration, the silica sol solution (liquid D) used as a binder component, acetone, ethanol (EA), propylene glycol monomethyl ether (PGM), diacetone alcohol (DAA) and formamide (FA) were added to obtain a transparent conductive film-forming coating liquid according to Comparative Example 3 (Ag: 0.08%, Au: 0.32%, $SiO_2$: 0.04%, water: 5.1%, acetone: 20%, EA: 54.4%, PGM: 15%, DAA: 5% and FA: 0.03%), which contained the chainlike agglomerates of noble metal-coated silver microparticles and the binder component, and was adjusted to a concentration to enable the coating liquid to be directly used in forming a transparent conductive film.

Then, the procedure of Example 1 was repeated except that this transparent conductive film-forming coating liquid was used, thereby obtaining a glass substrate provided with a transparent conductive single-layer film constituted of the chainlike agglomerates of noble metal-coated silver microparticles and the binder, that is, a transparent conductive layered structure according to Comparative Example 3.

Film characteristics (surface resistance, visible ray transmittance, haze value, visible ray reflectance and film strength) of the transparent conductive single-layer film formed on the glass substrate are shown in Table 1 below.

TABLE 1

| | Noble Metal-Coated Silver Microparticles: Composition | Binder Variety | Binder Content (*1) | Noble Metal-Coated Silver Microparticles: Chainlike Agglomerates | Surface Resistance ($\Omega/\square$) | Visible Ray Transmittance (%) | Haze Value (%) (*2) | Reflectance (%) | Film Strength |
|---|---|---|---|---|---|---|---|---|---|
| Example 1 | Ag-Au | inorganic (silica sol) | 100 | formed | 308 | 74.7 | 0.5 | 3.5 | good |
| Example 2 | Ag-Au | organic-inorganic | 50 | formed | 770 | 80.0 | 0.3 | 3.1 | good |
| Example 3 | Ag-Au | organic (epoxy resin) | 50 | formed | 895 | 80.3 | 0.3 | 2.9 | good |
| Comparative Example 1 | Ag-Au | inorganic (silica sol) | 100 | not formed | >$10^6$ | 72.3 | 0.5 | 4.2 | good |

TABLE 1-continued

|  | Noble Metal-Coated Silver Microparticles: Composition | Binder Variety | Binder Content (*1) | Noble Metal-Coated Silver Microparticles: Chainlike Agglomerates | Surface Resistance (Ω/□) | Visible Ray Transmittance (%) | Haze Value (%) (*2) | Reflectance (%) | Film Strength |
|---|---|---|---|---|---|---|---|---|---|
| Comparative Example 2 | Ag-Au | inorganic (silica sol) | 400 | formed | >10$^6$ | 73.8 | 0.8 | 3.9 | good |
| Comparative Example 3 | Ag-Au | inorganic (silica sol) | 10 | formed | 203 | 75.6 | 0.4 | 7.8 | bad (*3) |

(*1): Amount of binder based on 100 parts by weight of noble metal-coated silver microparticles (part by weight).
(*2): Value obtained by subtracting haze value of transparent substrate from haze value of substrate provided with transparent conductive film.
(*3): Simply released upon finger rubbing on film surface.

[Pencil Hardness Evaluation]

Pencil hardness was measured in relation to the glass substrate provided with a transparent conductive single-layer film according to Example 1. This film was "6H" in pencil hardness.

In the pencil hardness measurement, scratch marks were checked and evaluated which had been caused by drawing solid lines on the surface of the above transparent conductive single-layer film with pencils of H to 9H in hardness number and at a load of 1 kg.

[Evaluation]

The following facts are ascertained from the results shown in Table 1.

1. As to the transparent conductive single-layer film formed by use of the transparent conductive film-forming coating liquid obtained in Comparative Example 1 and containing the noble metal-coated silver microparticles held monodisperse, and the transparent conductive single-layer film formed by use of the transparent conductive film-forming coating liquid obtained in Comparative Example 2 and containing the binder in an amount set to exceed 200 parts by weight (i.e., 400 parts by weight), both films have as high a surface resistance as >10$^6$ (Ω/□). In contrast, it is ascertained that the transparent conductive single-layer films of each Example has a surface resistance of 308 (Ω/□) to 895 (Ω/□), which means superior conductivity.

2. As to the transparent conductive single-layer film formed by use of the transparent conductive film-forming coating liquid obtained in Comparative Example 3 and containing the binder in an amount set to be less than 40 parts by weight (i.e., 10 parts by weight), this film shows a superior surface resistance of 203 (Ω/□), but becomes simply released upon finger scratching on its surface. In contrast, it is ascertained that the transparent conductive single-layer film of each Example has a superior surface resistance and also has a film strength maintained at a level to assure practical application.

3. Additionally, from the measurement of pencil hardness, it is ascertained that the transparent conductive single-layer film of Example 1 exhibits a great film hardness (6H).

INDUSTRIAL APPLICABILITY

As stated above, the transparent conductive single-layer film according to the present invention, which has been formed by the use of the transparent conductive film-forming coating liquid of this invention, has excellent conductivity, high transmittance and great film strength. Accordingly, this film is suitably applicable to display devices such as a plasma display panel (PDP), a vacuum fluorescent display (VFD), a liquid crystal display (LCD), an organic/inorganic electroluminescence display (ELD) and the like, and is also useful for solar batteries such as a silicon semiconductor type, a Graztel model and the like, and transparent electrodes such as a touch panel and the like.

The invention claimed is:

1. A transparent conductive film for formation on a substrate comprising:
a single-layer film obtained by coating on a substrate a transparent conductive film-forming coating liquid which contains chainlike agglomerates of noble metal-coated silver microparticles and a binder, wherein the noble metal used in said noble metal-coated silver microparticles is at least one or more selected from gold, platinum, palladium, rhodium and ruthenium, said chainlike agglomerates having an average primary chain length set within the range of 250 to 500 nm, an average thickness set within the range of 1 to 30 nm and an average primary chain length-average thickness ratio set within the range of 3 to 100, and said binder being set within the range of 40 to 200 parts by weight based on 100 parts by weight of said noble metal-coated silver microparticles, wherein said single-layer film has a surface resistance of 50 to 2000 Ω/□ and a visible ray transmittance of 40 to 95% as determined alone and independently of said substrate.

2. A transparent conductive film according to claim 1, wherein said binder is an organic and/or inorganic binder, or an organic-inorganic composite binder.

3. A transparent conductive film-forming coating liquid comprising: a solvent;
chainlike agglomerates of noble metal-coated silver microparticles wherein the noble metal used in said noble metal-coated silver microparticles is at least one or more selected from gold, platinum, palladium, rhodium and ruthenium; and a binder, the latter two of which have been dispersed in said solvent, said chainlike agglomerates having an average primary chain length set within the range of 250 to 500 nm, an average thickness set within the range of 1 to 30 nm and an average primary chain length-average thickness ratio set within the range of 3 to 100, wherein said binder is set within the range of 40 to 200 parts by weight based on 100 parts by weight of said noble metal-coated silver microparticles.

4. A transparent conductive film-forming coating liquid according to claim 3,
wherein said binder is an organic and/or inorganic binder, or an organic-inorganic composite binder.

5. A transparent conductive film-forming coating liquid according to claim 4, wherein said organic binder is at least one or more selected from a thermoplastic resin, a thermosetting resin, a room-temperature-curing resin, an ultraviolet-curing resin and an electron-curing resin.

6. A transparent conductive film-forming coating liquid according to claim 4, wherein said inorganic binder is composed chiefly of silica sol.

7. A transparent conductive layered structure comprising: a transparent substrate; and a transparent conductive film according to one of claims 1 and 2 which has been formed on said transparent substrate.

8. A display device comprising a body member provided with a transparent conductive film,
wherein a transparent conductive layered structure according to claim 7 has been incorporated as said body member.

* * * * *